US011093407B2

(12) United States Patent
Serebrin et al.

(10) Patent No.: US 11,093,407 B2
(45) Date of Patent: Aug. 17, 2021

(54) INCREASING GRANULARITY OF DIRTY BIT INFORMATION IN HARDWARE ASSISTED MEMORY MANAGEMENT SYSTEMS

(71) Applicant: VMware, Inc., Palo Alto, CA (US)

(72) Inventors: Benjamin C. Serebrin, Sunnyvale, CA (US); Bhavesh Mehta, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/582,204

(22) Filed: Sep. 25, 2019

(65) Prior Publication Data

US 2020/0019512 A1    Jan. 16, 2020

Related U.S. Application Data

(62) Division of application No. 15/708,063, filed on Sep. 18, 2017, now Pat. No. 10,452,559, which is a division of application No. 13/185,008, filed on Jul. 18, 2011, now Pat. No. 9,767,039.

(51) Int. Cl.
*G06F 12/1036* (2016.01)
*G06F 12/10* (2016.01)

(52) U.S. Cl.
CPC .......... *G06F 12/1036* (2013.01); *G06F 12/10* (2013.01)

(58) Field of Classification Search
CPC ............................. G06F 12/10; G06F 12/1036
USPC ....................................................... 711/202, 6
See application file for complete search history.

(56) References Cited

U.S. PATENT DOCUMENTS

| | | | |
|---|---|---|---|
| 4,419,727 A | 12/1983 | Holtey et al. | |
| 5,526,504 A | 6/1996 | Hsu et al. | |
| 6,381,686 B1 * | 4/2002 | Imamura | G06F 12/08 711/117 |
| 6,684,305 B1 * | 1/2004 | Deneau | G06F 12/1072 711/133 |
| 6,725,366 B1 | 4/2004 | Swanberg | |
| 6,728,859 B1 | 4/2004 | Kissell | |
| 2007/0214340 A1 * | 9/2007 | Leveille | G06F 12/1483 711/203 |
| 2007/0283123 A1 | 12/2007 | Vick et al. | |
| 2009/0006805 A1 | 1/2009 | Anderson et al. | |
| 2009/0182976 A1 * | 7/2009 | Agesen | G06F 12/1009 711/207 |
| 2009/0187726 A1 | 7/2009 | Serebrin et al. | |

(Continued)

OTHER PUBLICATIONS

Adams, K. et al., "A Comparison of Software and Hardware Techniques for x86 Virtualization," Proceedings of ASPLOS XII, Oct. 2006, pp. 1-12.

(Continued)

*Primary Examiner* — Gautam Sain
(74) *Attorney, Agent, or Firm* — Patterson + Sheridan, LLP (57) ABSTRACT

In a computer system having virtual machines, one or more unused bits of a guest physical address range are allocated for aliasing so that multiple virtually addressed sub-pages can be mapped to a common memory page. When one bit is allocated for aliasing, dirty bit information can be provided at a granularity that is one-half of a memory page. When M bits are allocated for aliasing, dirty bit information can be provided at a granularity that is $1/(2^M)$-th of a memory page.

20 Claims, 10 Drawing Sheets

(56) References Cited

U.S. PATENT DOCUMENTS

| | | |
|---|---|---|
| 2009/0313445 A1 | 12/2009 | Pandey et al. |
| 2010/0299666 A1 | 11/2010 | Agbaria |
| 2011/0004739 A1 | 1/2011 | Hohmuth et al. |
| 2011/0023027 A1 | 1/2011 | Kegel et al. |
| 2011/0167196 A1* | 7/2011 | Scales ................ G06F 11/2097 711/6 |
| 2011/0320556 A1 | 12/2011 | Reuther |
| 2012/0102135 A1 | 4/2012 | Srinivasan et al. |
| 2012/0246437 A1 | 9/2012 | Radovic et al. |
| 2012/0278525 A1 | 11/2012 | Serebrin et al. |
| 2013/0024598 A1 | 1/2013 | Serebrin et al. |
| 2015/0186220 A1 | 7/2015 | Serebrin et al. |
| 2018/0004679 A1 | 1/2018 | Serebrin et al. |

OTHER PUBLICATIONS

AMD-V{tm} Nested Paging, White Paper, Jul. 2008, pp. 1-19, Revision: 1.0, Advanced Micro Devices, Inc.

Bhargava, R. et al., "Accelerating Two-Dimensional Page Walks forVirtualized Systems," Proceedings of ASPLOS XIII, Mar. 2008, pp. 1-10.

\* cited by examiner

INCREASING GRANULARITY OF DIRTY BIT INFORMATION IN HARDWARE ASSISTED MEMORY MANAGEMENT SYSTEMS

CROSS-REFERENCE TO RELATED APPLICATIONS

This application is a divisional of prior U.S. application Ser. No. 15/708,063, filed Sep. 18, 2017, which claims the benefit of U.S. application Ser. No. 13/185,008, filed Jul. 18, 2011, and issued as U.S. Pat. No. 9,767,039, the entire contents of each of which are incorporated by reference herein.

BACKGROUND

Modern computers employ virtual memory to decouple processes, e.g., applications running on top of an operating system, from the physical memory addresses backing the address space of the processes. Using virtual memory enables processes to have a large contiguous address space, and allows the computer to run more processes than can fit simultaneously in their entirety in the available physical memory (i.e., to "over-commit" memory). To do this, virtual memory space is divided into pages of a fixed size (for example, x86 architectures use page sizes of 4 KB, 2 MB, or 1 GB), and each page of the virtual memory space either maps onto a page within the physical memory of the same page size or it maps to nothing. Much of the description in this patent will be in terms of x86 architectures. However, a person of skill in the art will understand how to apply the teachings of the invention to other processor architectures.

Translation of a virtual memory address to a physical memory address is done by traversing page tables in memory that contain mapping information. To speed up translation, a translation look-aside buffer (TLB) is typically used. The TLB provides faster translation of virtual addresses to physical addresses than does accessing page tables in memory because the TLB can provide the beginning-to-end mapping in a single step, and because the TLB can be implemented in a small (and, therefore, fast to access) data structure closer to or in the CPU itself. However, the TLB is limited in size and it is possible that a virtual memory page cannot be found in the TLB. Whenever this happens, a "TLB miss" occurs, and the mapping has to be performed by a traversal of the page tables, commonly known as a "page walk," a much slower process than look-ups in the TLB.

In virtualized computer systems, where multiple virtual machines, each having an operating system and applications running therein, can be configured to run on a single hardware platform, memory management for the virtual machines may be carried out by memory management units (MMUs) configured in CPUs that support nested page walks. In such systems, a first set of page tables, referred to herein as guest page tables (gPTs), map the virtual address space of applications running in the virtual machines, referred to herein as guest virtual address space, to the physical address space that has been emulated for the virtual machines, referred to herein as guest physical address space. Additionally, a second set of page tables, referred to herein as nested page tables (NPTs) (also known as extended page tables), map the guest physical address space to the address space of machine memory, referred to herein as machine memory address space. Both the first and second sets of page tables are hierarchically arranged and a pointer to the top-level, root table for each set of page tables is stored in a distinct register. In x86 architectures that support nested page walks, the register that stores a pointer to the root table of the gPTs is known as the gCR3 register and the register that stores a pointer to the root table of the NPTs is known as the nCR3 register. It should be recognized that non-x86 architectures employing guest page tables and nested page tables, or the like, may have different structures and accessed in a different manner.

Figure 1:
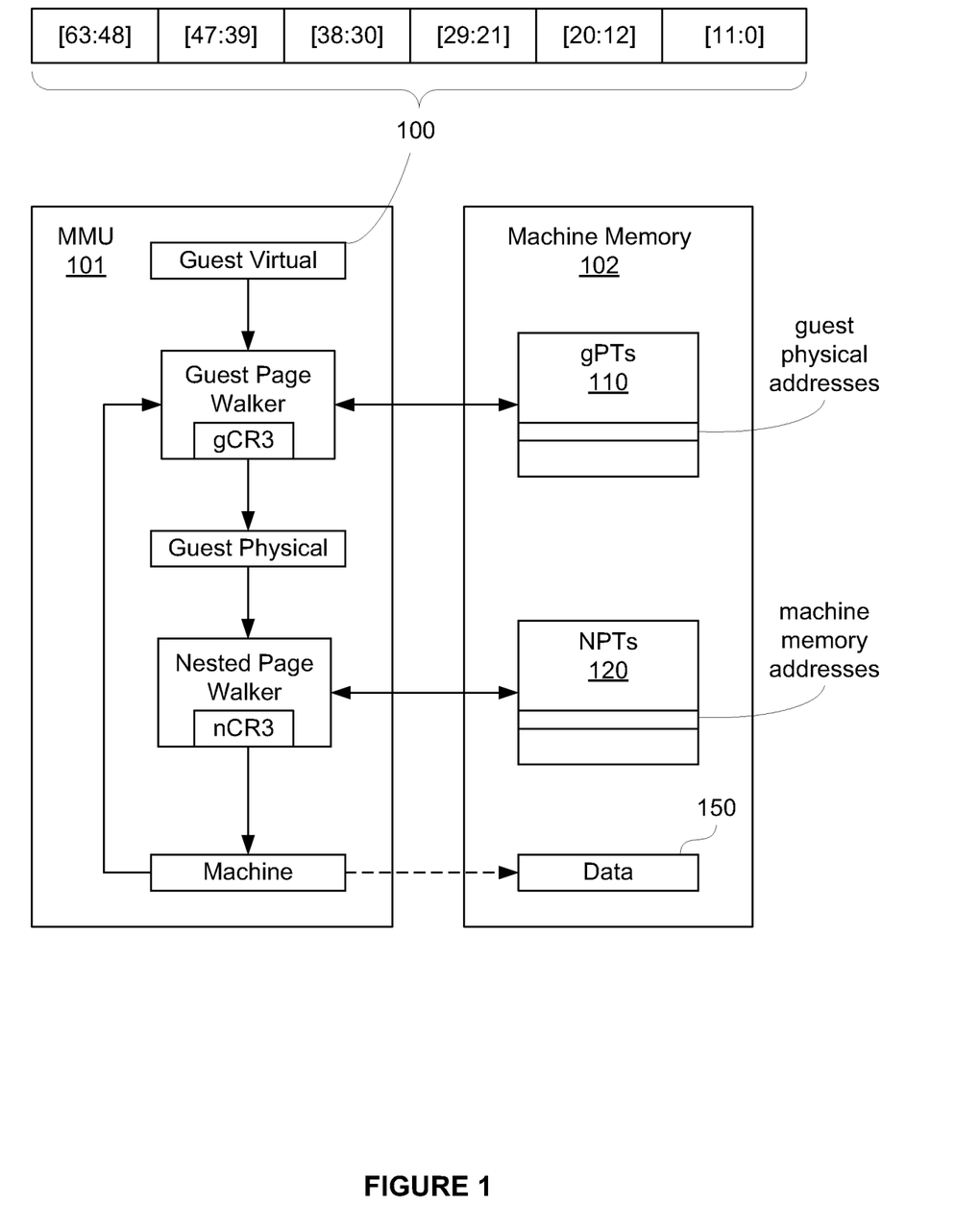
FIG. 1 is a schematic diagram that illustrates nested page walks in a virtualized computer system.

FIG. 1 is a schematic diagram that illustrates nested page walks in a virtualized computer system. In the example of FIG. 1, a guest virtual address 100 is being mapped by MMU 101 to a machine memory address of data 150 stored in machine memory 102 using gPTs 110 and NPTs 120, which are also stored in machine memory 102. Contents of gPTs 110 at all levels include pointers, expressed as guest physical addresses, to guest page tables or guest memory pages, and also permission bits, present bits, and other control bits, and in some implementations, accessed and dirty bits. Contents of NPTs 120 at all levels include pointers, expressed as machine memory addresses, to nested page tables or machine memory pages and also permission bits, present bits, and other control bits, and in some implementations, accessed and dirty bits.

The mapping begins with the guest page walker module of MMU 101 retrieving a pointer to the root table of gPTs 110 from the gCR3 register, which is an address in the guest physical address space. Bits [47:39] of guest virtual address 100 and 3 trailing bits of zeros define the index into the root table and are copied into the 12 least significant bits of this guest physical address. The resulting guest physical address, known as the gL4 address, is translated into a machine memory address using the nested page walker module of MMU 101 and NPTs 120, and the translated address is used to retrieve an address of the next lower-level (L3) table, which is also an address in the guest physical address space. Bits [38:30] of guest virtual address 100 and 3 trailing bits of zeros define the index into this L3 table and are copied into the 12 least significant bits of this guest physical address. The resulting guest physical address, known as the gL3 address, is translated into a machine memory address using the nested page walker module of MMU 101 and NPTs 120, and the translated address is used to retrieve an address of the next lower-level (L2) table, which is also an address in the guest physical address space. Bits [29:21] of guest virtual address 100 and 3 trailing bits of zeros define the index into this L2 table and are copied into the 12 least significant bits of this guest physical address. The resulting guest physical address, known as the gL2 address, is translated into a machine memory address using the nested page walker module of MMU 101 and NPTs 120, and the translated address is used to retrieve an address of the next lower-level (L1) table, which is also an address in the guest physical address space. Bits [20:12] of guest virtual address 100 and 3 trailing bits of zeros define the index into this L1 table and are copied into the 12 least significant bits of this guest physical address. The resulting guest physical address, known as the gL1 address, is translated into a machine memory address using the nested page walker module of MMU 101 and NPTs 120, and the translated address is used to retrieve an address of a data page, which is also an address in the guest physical address space. Bits [12:0] of guest virtual address 100 define the index into this data page and are copied into the 12 least significant bits of this guest physical address. The resulting guest physical address, known as the gPA address, is translated into a machine memory address using the nested page walker module of MMU 101 and NPTs 120, and the translated address is used to retrieve the desired content, i.e., data 150.

Bottom-level (L1) tables of gPTs and NPTs have page table entries (PTEs) containing pointers to guest physical or machine memory pages and auxiliary information including an accessed bit (A bit), a dirty bit (D bit), and various other bits. The A bit, if set to one, indicates that the memory page referenced by the entry has been accessed since the A bit was last cleared. The D bit, if set to one, indicates that the memory page referenced by the entry has been modified since the D bit was last cleared. The dirty bit may be cleared, i.e., set to zero, when the contents of the modified memory page are committed to disk.

A bits and D bits are examined by various processes before taking some action. In a virtualized computer system, D bits of PTEs are continuously examined during a process for performing backups and during a process for migrating the executing state of virtual machines, to identify those memory pages that have been modified and to transmit to the backup target machine or the migration target machine only those memory pages that have been modified. Alternatively, an operation known as a "diff" operation may be performed on the memory pages that have been modified to identify the changed portions of the memory pages, and only the changed portions are transmitted to the target machine.

When page sizes are relatively large, the efficiency of processes such as the backup process and the migration process is compromised because any modification of a memory page regardless of the size of the modification will cause that memory page to be backed up or migrated. For example, if the memory page size is 4 KB and 8 bytes were written to that memory page, the entire 4 KB page will need to be backed up or migrated. It may be possible to build x86 page tables with smaller memory page sizes but this might not be desirable because such a change could affect memory system performance adversely in other ways or be an implementation burden.

SUMMARY

One or more embodiments of the present invention provide techniques for increasing the granularity of dirty bit information in a computer system configured with virtual machines, without changing the default memory page size and with minimal changes to existing memory management hardware. According to such techniques, one or more unused bits of a guest physical address range are allocated for aliasing so that multiple page table entries can be mapped to a common memory page. When one bit is allocated for aliasing, dirty bit information can be provided at a granularity that is one-half of a memory page. When two bits are allocated for aliasing, dirty bit information can be provided at a granularity that is one-fourth of a memory page. In general, when N bits are allocated for aliasing, a granularity of $2^N$ sub-regions of a memory page is achieved.

A data structure according to an embodiment of the present invention includes a set of first mapping tables that are hierarchically arranged and define mappings between guest virtual addresses and guest physical addresses, and a set of second mapping tables that are hierarchically arranged and define mappings between guest physical addresses and machine memory addresses. The set of second mapping tables includes a root table and a plurality of bottom-level tables, wherein each entry of the bottom-level tables references a machine memory page in common with at least one other entry of the bottom-level tables, and the at least two entries that reference the machine memory page in common provide different indications as to whether the corresponding sub-section of the machine memory page is dirty or not.

A method of mapping virtual addresses to machine memory addresses in a computer system, according to an embodiment of the present invention, includes the steps of receiving a guest virtual address to be mapped, traversing guest page tables using portions of the guest virtual address to obtain a guest physical address corresponding to the guest virtual address, modifying a binary representation of the guest physical address by copying the value of a first bit of the binary representation to a second bit of the binary representation, wherein the second bit is more significant than the first bit, and translating the guest physical address to a machine memory address using the modified binary representation.

A method of backing up a virtual machine, according to an embodiment of the present invention, includes the steps of scanning entries of first and second nested page tables that reference a common machine memory page, determining that a first section of the common machine memory page is dirty based on the entry of the first page table that references the common machine memory page and determining that a second section of the common machine memory page is not dirty based on the entry of the second page table that references the common machine memory page, performing an operation on the first section of the common machine memory page to determine changes to data stored in the first section of the common machine memory page, and transmitting the changes to the data stored in the first section of the common machine memory page to a backup system.

A method of migrating an executing state of a virtual machine running in a first computer system to a second computer system, according to an embodiment of the present invention includes the steps of scanning entries of first and second nested page tables that reference a common machine memory page, determining that a first section of the common machine memory page is dirty based on the entry of the first page table that references the common machine memory page and determining that a second section of the common machine memory page is not dirty based on the entry of the second page table that references the common machine memory page, and transmitting the first section of the common machine memory page to the second computer system.

Further embodiments of the present invention include, without limitation, a non-transitory computer-readable storage medium that includes instructions that enable a processing unit to implement one or more aspects of the above methods as well as a computer system configured to implement one or more aspects of the above methods.

DETAILED DESCRIPTION

Figure 2:
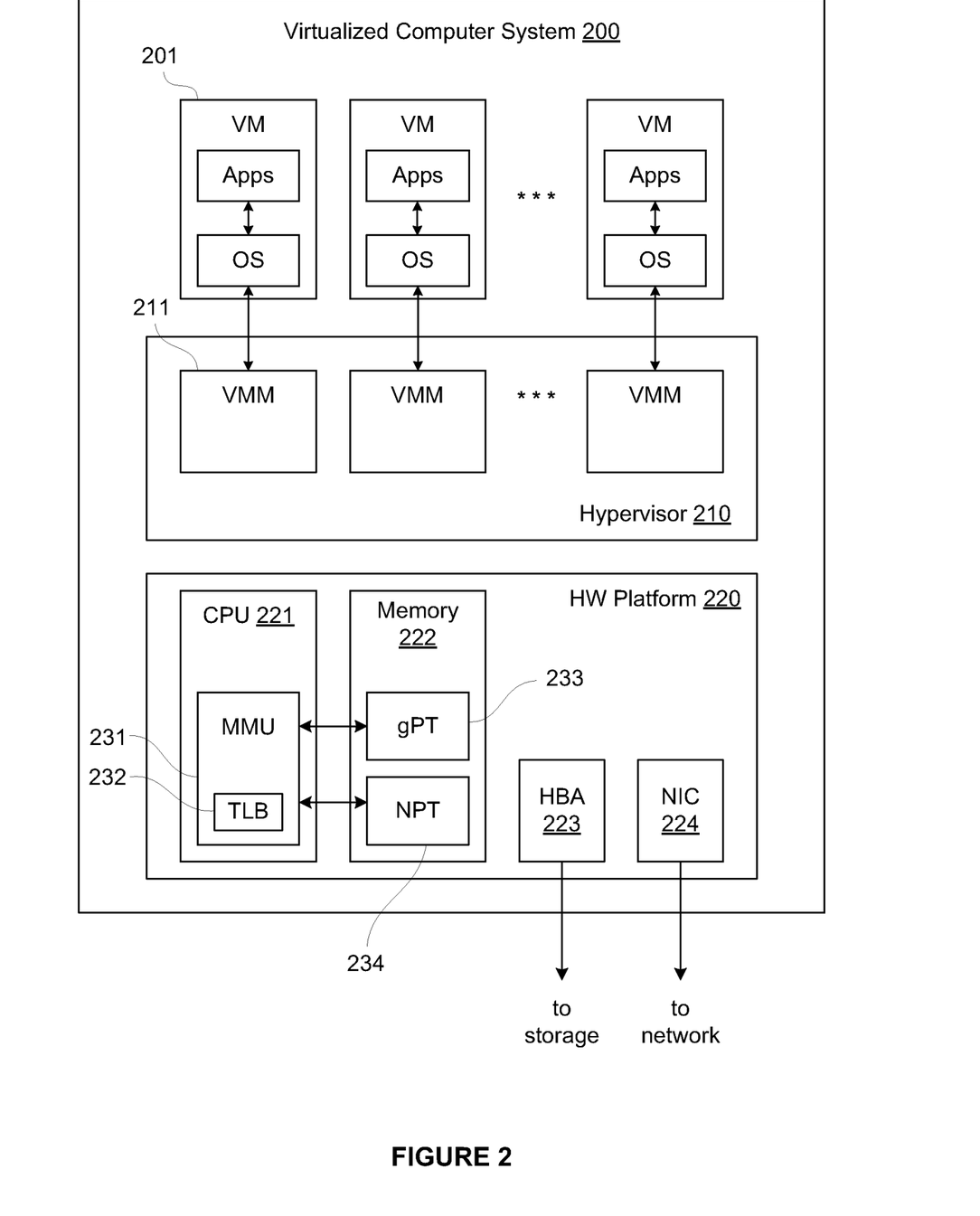
FIG. 2 depicts a block diagram of a virtualized computer system in which one or more embodiments of the present invention may be practiced.

FIG. 2 depicts a block diagram of a virtualized computer system in which one or more embodiments of the present invention may be practiced. Virtualized computer system 200 includes multiple virtual machines (VMs), including VM 201, that are running on top of hypervisor 210. Each VM is an abstraction of a physical computer system having virtual hardware resources and a guest operating system that provides guest applications running in the VM an interface to the virtual hardware resources. Hypervisor 210 includes a plurality of software layers including a kernel that manages hardware resources of hardware platform 220 through various drivers (not shown), and virtual machine monitors (VMMs) 211 each emulating hardware resources for a corresponding one of VMs. Hardware platform 220 includes one or more central processing unit (CPU) 221, machine memory 222, a host bus adapter (HBA) 223 that connects virtualized computer system 200 to a persistent storage unit such as a disk array, and a network interface card (NIC) 224 that connects virtualized computer system 200 to a network. CPU 221 has a memory management unit (MMU) 231 that carries out the mappings from the guest virtual address space to the guest physical address space and from the guest physical address space to the machine memory address space using guest page tables (gPTs) 233 and nested page tables (NPTs) 234 stored in machine memory 222, or directly from the guest virtual address space to the machine memory address space using a translation look-aside buffer (TLB) 232. It should be recognized that gPTs 233 are maintained by the guest operating system of a particular VM to provide mapping from guest virtual address space to guest physical address space, and NPTs 234 are maintained by hypervisor 210 to provide mappings from the guest physical address space to the machine memory address space.

It should be recognized that the various terms, layers and categorizations used to describe the virtualization components in FIG. 2 may be referred to differently without departing from their functionality or the spirit or scope of the invention. One example of hypervisor 210 that may be used is included as a component of VMware's vSphere product, which is commercially available from VMware, Inc. of Palo Alto, Calif. ("VMware"). It should further be recognized that other virtualized computer systems are contemplated, such as hosted virtual machine systems, where hypervisor 210 is implemented in conjunction with an operating system installed on hardware platform 220.

FIGS. 3A-3E are schematic diagrams that illustrate nested page walks according to one or more embodiments of the present invention. The nested page walks shown in FIGS. 3A-3E are carried out in one or more embodiments of the present invention when MMU 231 carries out a mapping of a guest virtual address to a machine memory address. Such mapping begins with the guest page walker module of MMU 231 retrieving a pointer to the root (L4) table of gPTs 233 from the gCR3 register, which is an address in the guest physical address space, and copying bits [47:39] of the guest virtual address and 3 trailing bits of zeros into the 12 least significant bits of this guest physical address. The resulting guest physical address, known as the gL4 address, is translated into a machine memory address according to the nested page walk shown in FIG. 3A. The guest page walker module of MMU 231 then retrieves an address of the next lower-level (L3) table, which is also an address in the guest physical address space, using the translated address, and copies bits [38:30] of the guest virtual address and 3 trailing bits of zeros into the 12 least significant bits of this retrieved address. The resulting guest physical address, known as the gL3 address, is translated into a machine memory address according to the nested page walk shown in FIG. 3B. The guest page walker module of MMU 231 then retrieves an address of the next lower-level (L2) table, which is also an address in the guest physical address space, using the translated address, and copies bits [29:21] of the guest virtual address and 3 trailing bits of zeros into the 12 least significant bits of this retrieved address. The resulting guest physical address, known as the gL2 address, is translated into a machine memory address according to the nested page walk shown in FIG. 3C. The guest page walker module of MMU 231 then retrieves an address of the next lower-level (L1) table, which is also an address in the guest physical address space, using the translated address, and copies bits [20:12] of the guest virtual address and 3 trailing bits of zeros into the 12 least significant bits of this retrieved address. The resulting guest physical address, known as the gL1 address, is translated into a machine memory address according to the nested page walk shown in FIG. 3D. The guest page walker module of MMU 231 then retrieves an address of the data page, which is also an address in the guest physical address space, using the translated address, and copies bits [11:0] of the guest virtual into the 12 least significant bits of this retrieved address. The resulting guest physical address, known as the gPA address, is translated into a machine memory address according to the nested page walk shown in FIG. 3E, and the desired content is retrieved from this translated address.

Page tables depicted in FIGS. 3A-3E are arranged hierarchically. They include a single root table 321 having entries containing pointers to multiple second-level tables 322 (including tables 322a-322j), each having entries containing pointers to multiple third-level tables 323 (including tables 323a-323j), each having entries containing pointers to multiple fourth-level or bottom-level page tables 324 (including tables 324a-324j). Entries of bottom-level page tables 324 contain pointers 332, 333 (including pointers 332a, 332c, 332e, 332g, 332i, 333b, 333d, 333f, 333h, 333j) to machine memory pages 325 (e.g., machine memory page 325A-E). These entries also have a D bit (e.g., D bits 334a, 334c, 334e, 334g, 334i, 335b, 335d, 335f, 335h, 335j), the value of which indicates whether or not the portion of the machine memory page referenced by the entry is dirty. In one embodiment, a D bit value of one indicates that the referenced portion of the machine memory page is dirty and a D bit value of zero indicates that the referenced portion of the machine memory page is not dirty. In each of FIGS. 3A-3E, D bit 334 has a value of 1, indicating that the bottom half of the machine memory page 325 referenced by the entry is dirty, and D bit 335 has a value of 0, indicating that the top half of the machine memory page 325 referenced by the entry is not dirty. The MMU (e.g., MMU 231) obtains the location of root table 321 by accessing a register 320 (e.g., nCR3 register). Then, successive 9-bit segments of the binary representation of an address to be translated are used to index into the page tables at different levels. The 12 least significant bits of the binary representation of the guest physical address are used as an offset into machine memory page 325. Bits [63:48] are not used in the mapping in this embodiment as is the convention in memory management schemes for x86 architectures. However, bits [51:48] are defined as available extension bits of a physical address range. It should be clear to a person of skill in the art that an L5 table can be added, with corresponding extension of the page walks described herein, to enable translations of 52-bit guest physical addresses.

The structure of nested page tables shown in FIGS. 3A-3E is the same as conventional page tables. However, before mapping a guest physical address (e.g., gL4 in FIG. 3A, gL3 in FIG. 3B, gL2 in FIG. 3C, gL1 in FIG. 3D, and gPA in FIG. 3E) to a machine memory address, aliasing of the bits of the guest physical address is performed, if permitted. Aliasing is permitted in one or more embodiments of the present invention if the bit or bits that are being aliased have zero values.

Figure 3A:
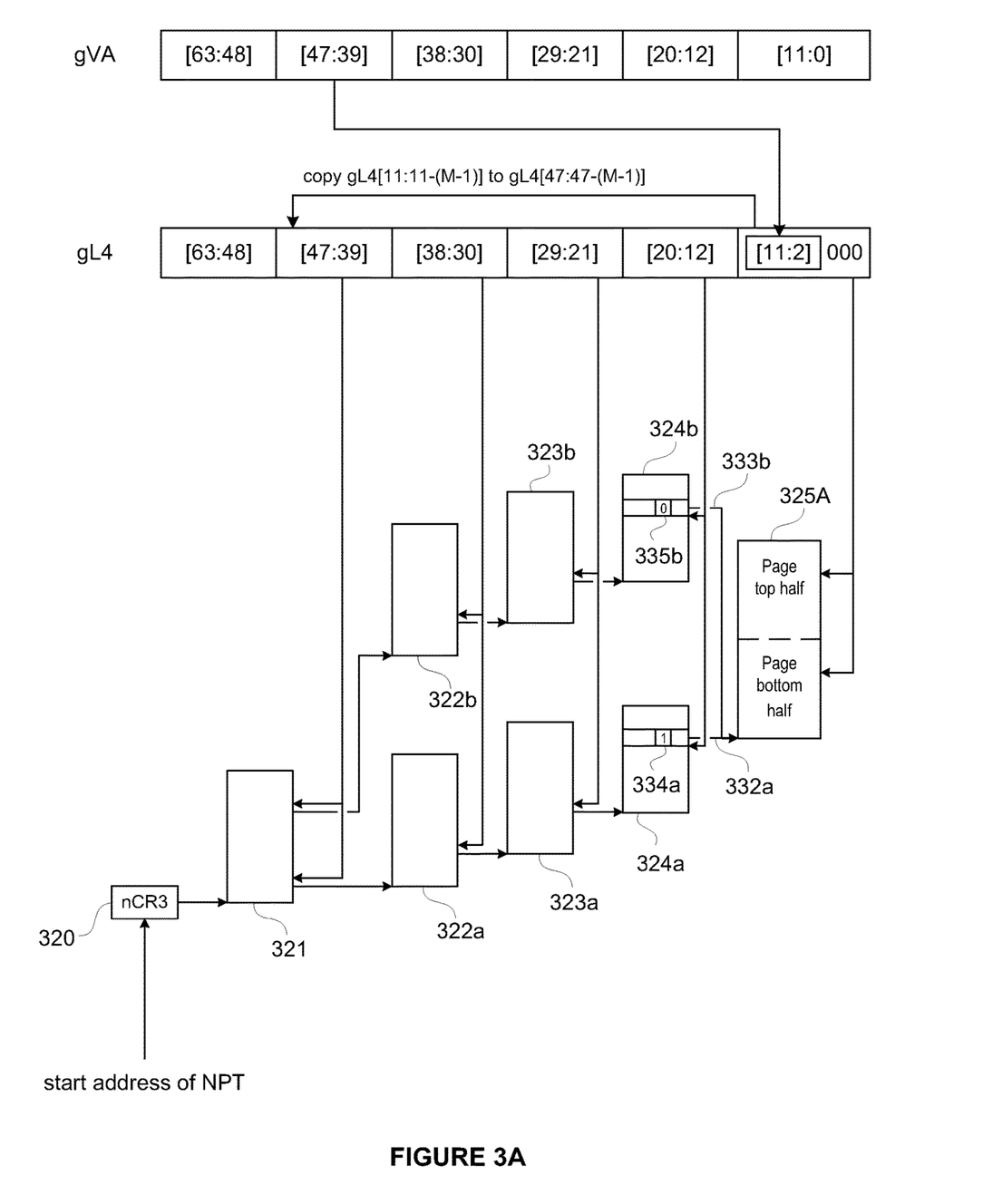
FIGS. 3A-3E are schematic diagrams that illustrate nested page walks according to one or more embodiments of the present invention.
Figure 3B:
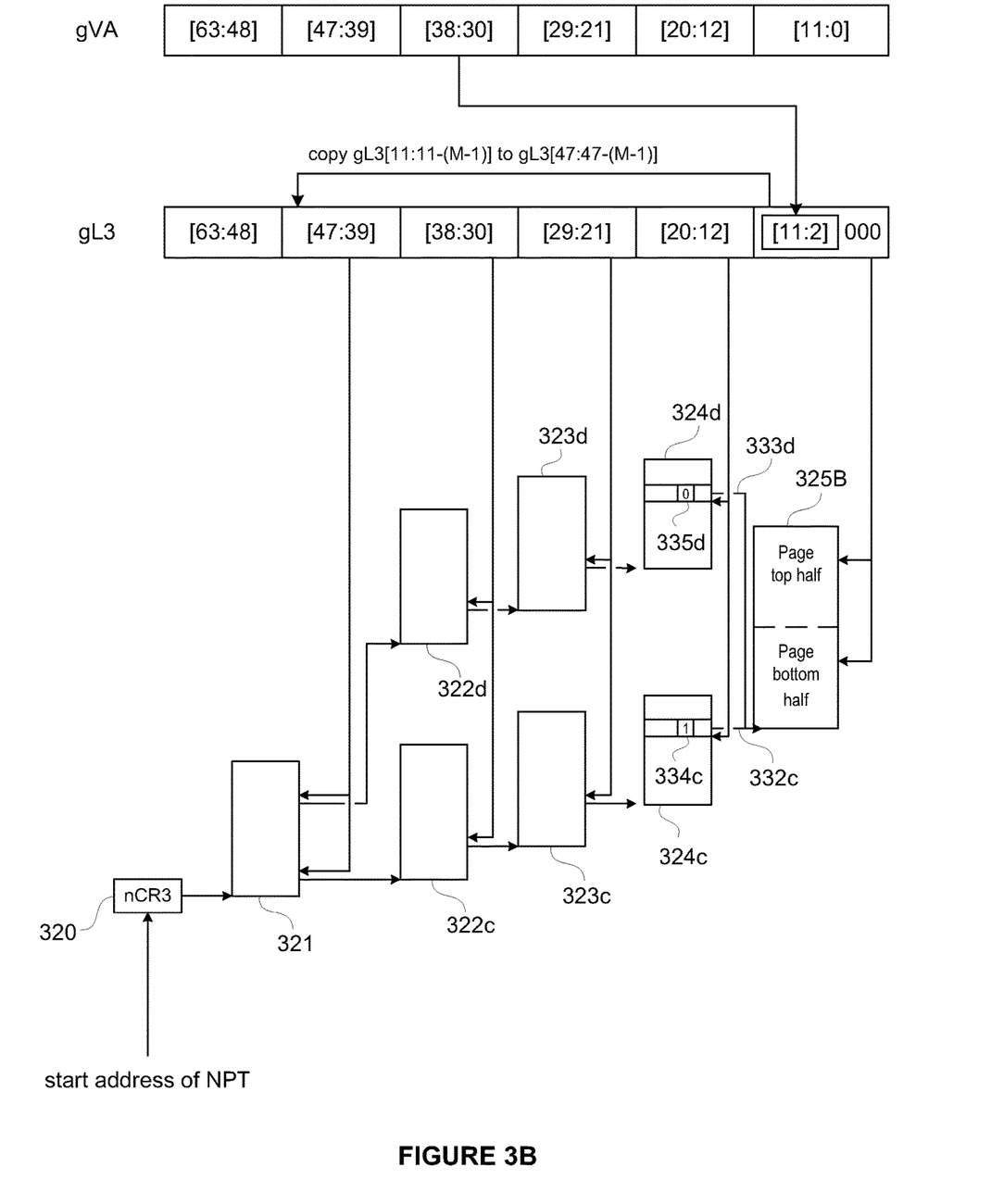
Figure 3C:
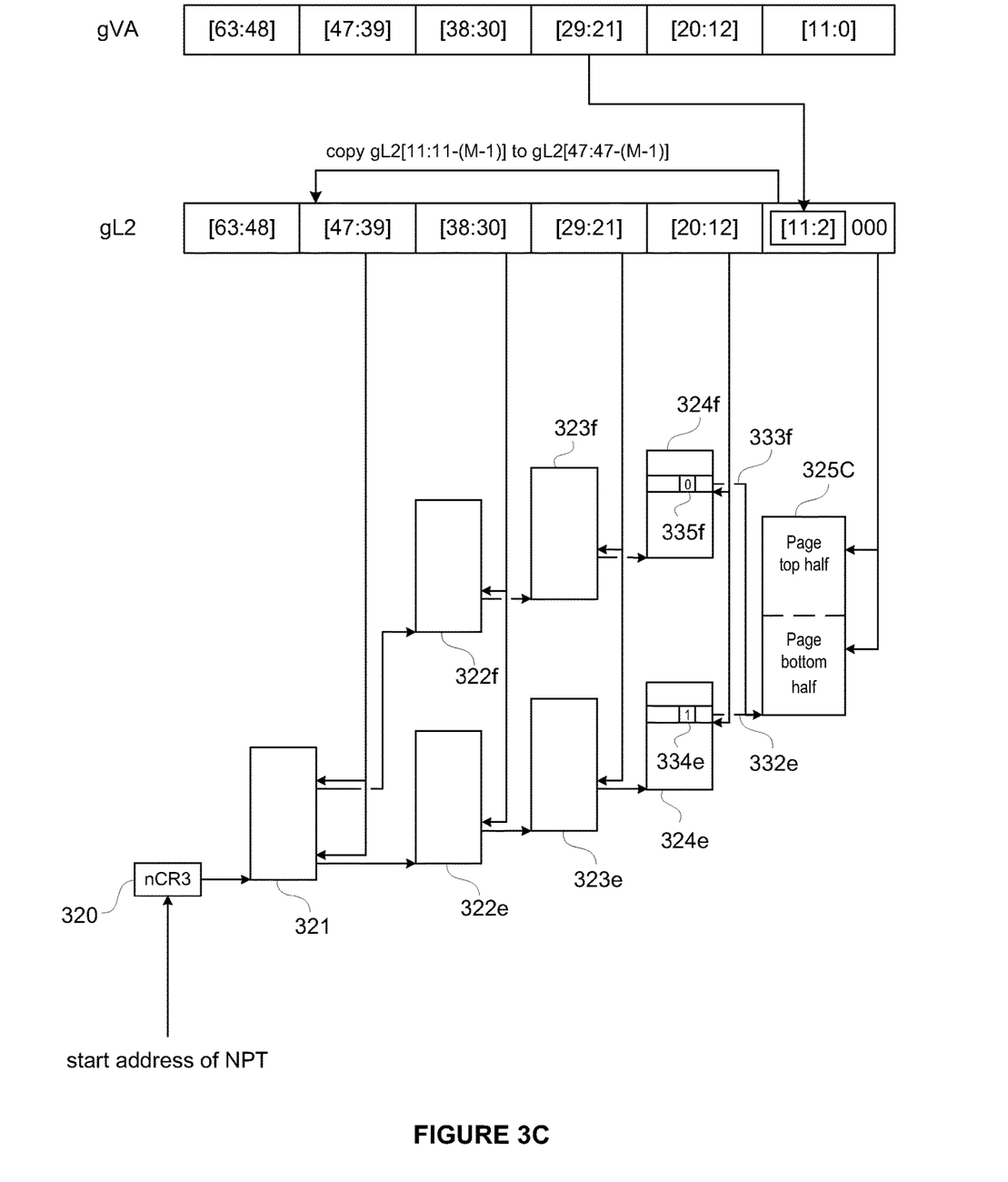
Figure 3D:
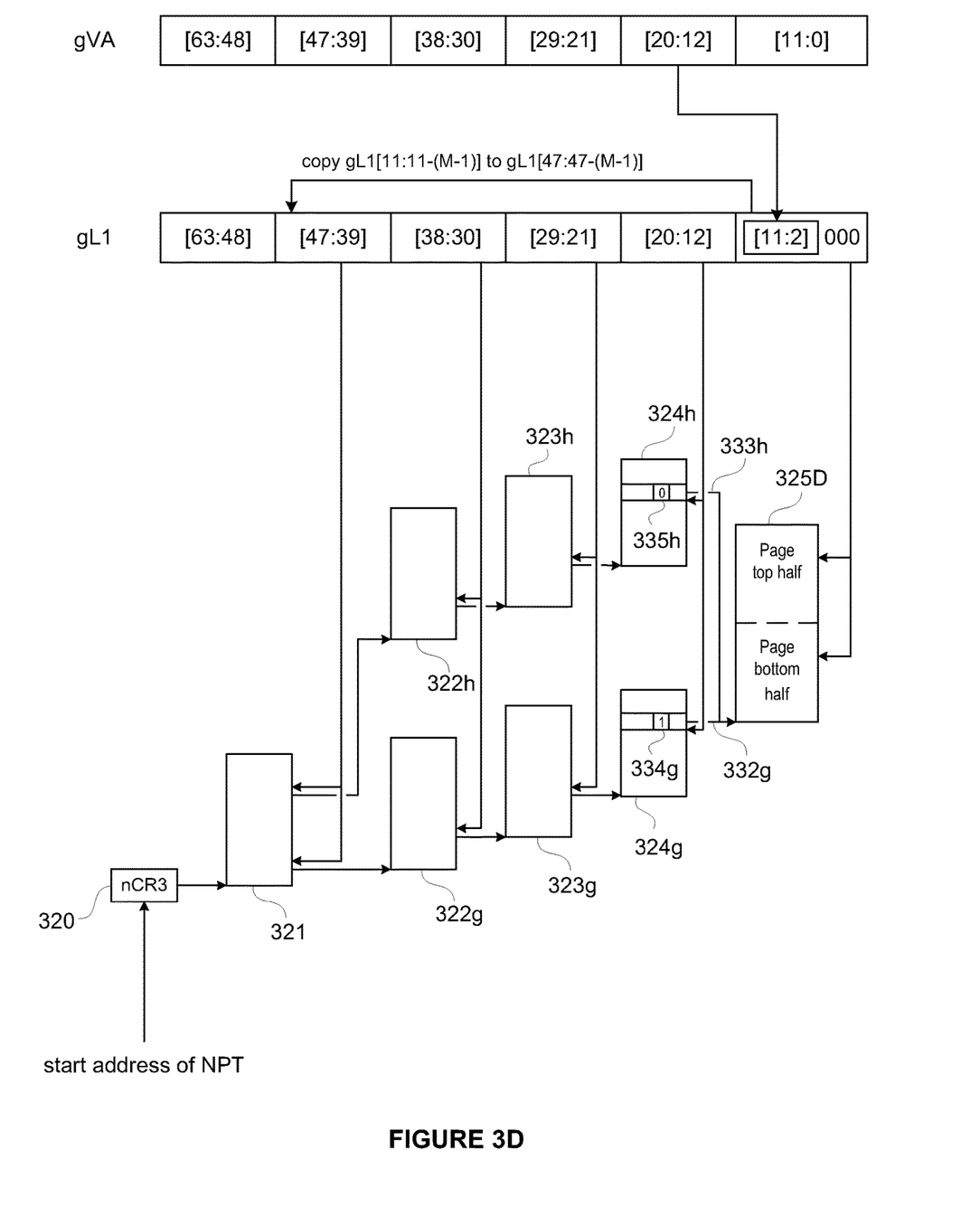
Figure 3E:
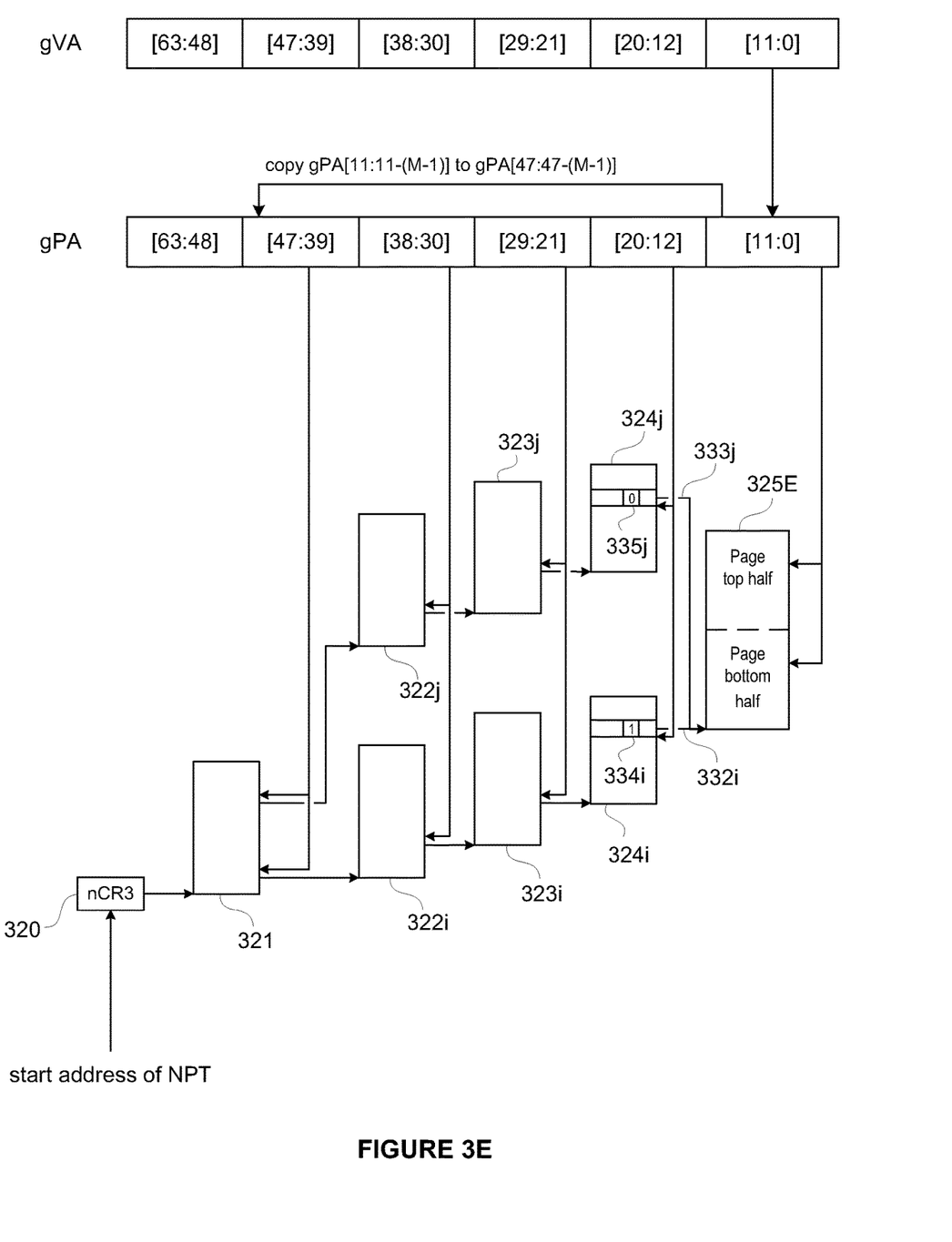

In one embodiment of the present invention, when aliasing is permitted, values of M bits of the guest physical address are respectively copied into bits [47:47−(M−1)] of the guest physical address. For example, if M is two, the values of bits [11:10] from the guest physical address are copied into bits [47:46]. This copying is performed by MMU 231. Thus, for example, existing x86 processors may be modified to perform this copying when performing memory accesses. This copying creates $2^M$ aliased physical address regions within the nested page tables. The contents of corresponding entries of bottom-level page tables in multiple aliased physical address regions are configured to reference the same machine memory page (e.g., bottom-level page tables 324*i*, 324*j* reference machine memory page 325E in FIG. 3E). If M is one, corresponding entries from two different bottom-level page tables reference the same machine memory page, the entry from the bottom-level page table corresponding to a value of zero at bit [11] being associated with the bottom half of the machine memory page and the entry from the bottom-level page table corresponding to a value of one at bit [11] being associated with the top half of the machine memory page. Thus, for example, referring to FIG. 3E, second-level page table 322*i*, third-level page table 323*i* and bottom-level page table 324*i* correspond to bit [11] (and therefore also bit [47]) having a value of zero; while second-level page table 322*j*, third-level page table 323*j* and bottom-level page table 324*j* correspond to bit [11] (and therefore also bit [47]) having a value of one. As shown in FIG. 3E, the values of the D bits of these entries (D bit 334*i* and D bit 335*j*) may be different. This would happen if, as in the example shown in FIG. 3E, the bottom half of the machine memory page was modified but the top half was not. This would also happen if the situation were reversed, where the bottom half of the machine memory page was not modified but the top half was. If M is two, corresponding entries from four bottom-level page tables reference the same machine memory page and each such entry is associated with a distinct quarter section of the machine memory page.

In the page table data structure illustrated in FIGS. 3A-3E, when M is one, two different guest physical addresses map to the same machine memory page. The difference in the binary representations of these two guest physical addresses is the modification performed as described above that copies the 12-th least significant bit (bit [11]) into a more significant bit. More generally, if M is one and machine memory pages are managed in units of L bytes, the difference in the binary representations of these two virtual addresses is the modification performed as described above that copies the N-th least significant bit, where $2^N=L$, into a more significant bit.

Embodiments of the present invention described herein employ guest and nested page tables having a 4-level hierarchy and page sizes of 4 KB. It should be understood that the present invention is applicable to page tables having different levels of hierarchy and to different page sizes by monitoring D bits at higher levels in the page table hierarchy.

In an alternative embodiment, a hardware configuration register, whose bits [47:12] can be set or cleared by hypervisor 210, is provided. For each bit that is set in this bit vector, the corresponding bit of the guest physical address is claimed as an alias bit. So if M bits are set in this configuration register, there are $2^M$ aliases. The hardware will then copy bits [11:11−(M−1)] into the bit positions of the guest physical address corresponding to the bits that are set in the hardware configuration register, from highest-to-lowest. The bits that are set to 1 in the hardware configuration register need not be contiguous.

Figure 4:
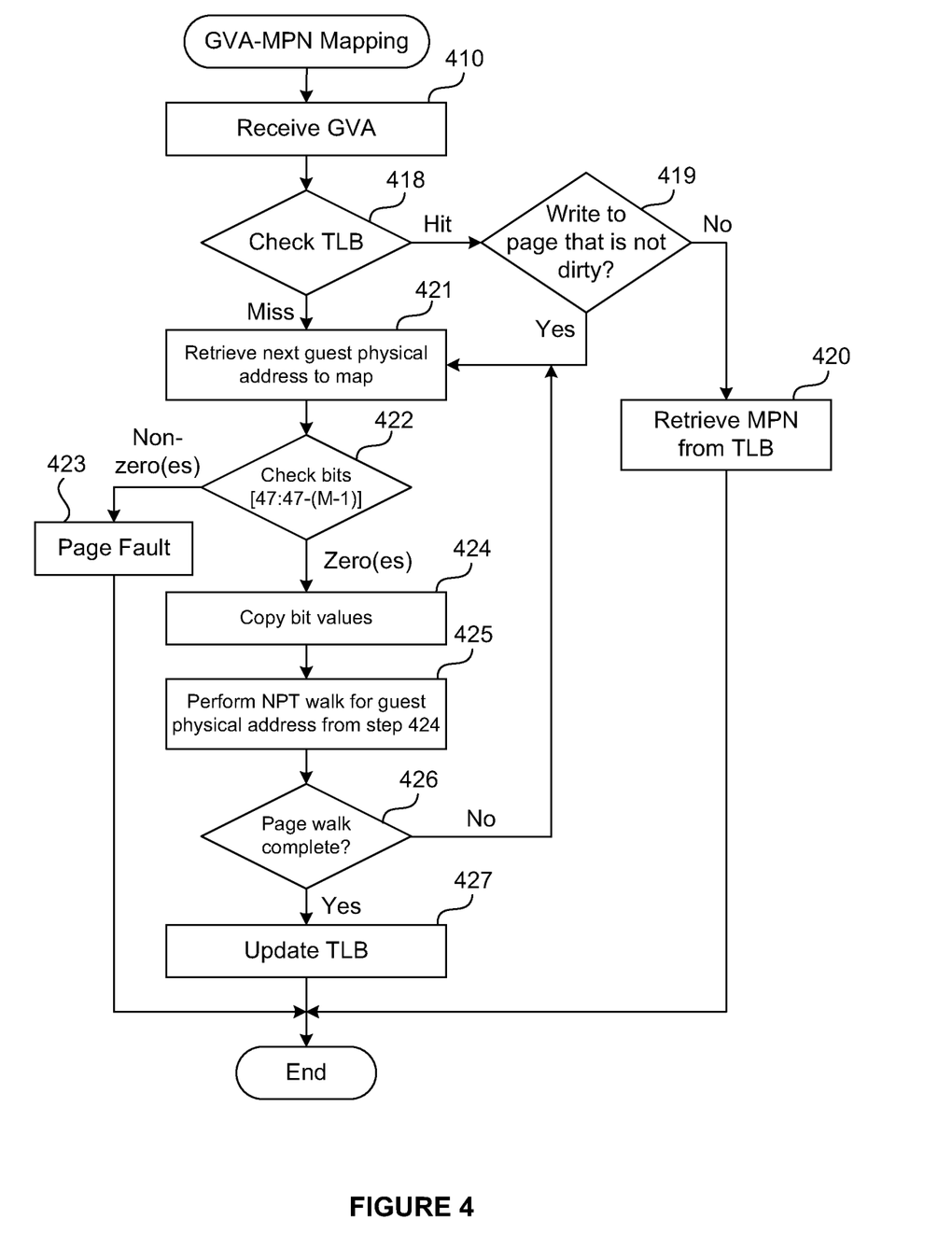
FIG. 4 is a flow diagram that illustrates the method for mapping virtual addresses to machine memory pages, according an embodiment of the present invention.

FIG. 4 is a flow diagram that illustrates the method for mapping guest virtual addresses to machine page numbers, according an embodiment of the present invention. The mapping may be performed to carry out a read operation or a write operation. In the embodiment illustrated herein, the MMU (e.g., MMU 231) is performing the mapping using TLB (e.g., TLB 232) or page tables (e.g., page tables 233, 234). At step 410, the MMU receives the guest virtual address to be mapped in binary form. Then, at step 418, the TLB is checked to see if it contains a mapping for the modified guest virtual address, in particular bits [47:12] of the modified guest virtual address. If it does, another check is carried out at step 419 if the operation is a write operation. At step 419, it is determined whether the machine page number that the TLB associates with the guest virtual address is indicated in the TLB as being dirty or not. If it is indicated as being dirty (associated dirty bit value=1), step 420 is carried out, where the machine page number that the TLB associates with the guest virtual address is retrieved from the TLB and the method terminates. If the machine page number that the TLB associates with the guest virtual address is not indicated as being dirty (associated dirty bit value=0), the loop consisting of steps 421 through 426 is carried out. The loop consisting of steps 421 through 426 is also carried out if a TLB miss is determined at step 418.

The first time through the loop, the guest physical address stored in gCR3 is retrieved at step 421. During subsequent passes through the loop, the guest physical addresses are retrieved from machine memory addresses obtained from nested page walks carried out at step 425. At step 422, bits [47:47−(M−1)] of the retrieved guest physical address are examined for zeroes. If they are all zeroes, the loop continues onto step 424. If one or more of the bits [47:47−(M−1)] are not zero, a page fault is issued at step 423 and the method terminates. At step 424, bit values at bits [11:11−(M−1)] are copied into bits [47:47−(M−1)] to produce the guest physical address to be used for traversing the nested page tables. The nested page tables are traversed at step 425 using the guest physical address produced at step 424 to obtain a machine memory address of the next guest page table to be traversed or the machine memory page corresponding to the guest virtual address to be mapped. If, according to step 426, the guest table page walk is complete (e.g., the page walk shown in FIG. 3E is carried out at step 425 and the machine memory address of the machine memory page corresponding to the guest virtual address to be mapped is obtained), bits [47:12] of the machine memory address obtained at step 425 along with the dirty bit value, which will be 1 in the case of a write operation, is added to the TLB at step 427. The method terminates thereafter. If, according to step 426, the guest table page walk is not complete, e.g., one of the page walks shown in FIGS. 3A-3D is carried out at step 425 and the machine memory address of the next guest page table to be traversed is obtained, the flow returns to step 421.

Figure 5:
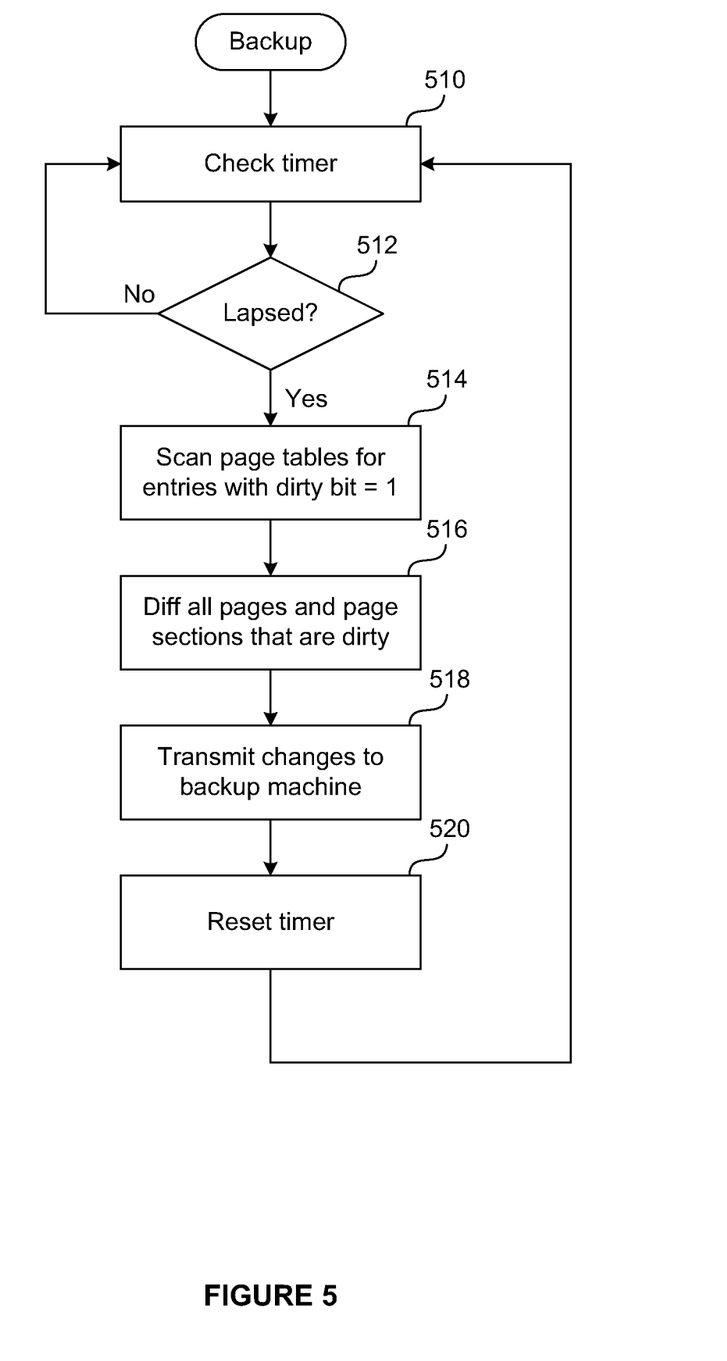
FIG. 5 is a flow diagram that illustrates the method for backing up a virtual machine, according an embodiment of the present invention.

FIG. 5 is a flow diagram that illustrates the method for backing up a virtual machine, according to an embodiment of the present invention. In the embodiment described herein, hypervisor 210 is carrying out this method on a periodic basis, and the time interval between backups is set in accordance with a recovery point objective (RCO) that is specified in a backup policy. The backup method described herein may be applied to provide fault-tolerant, high-availability VMs.

Steps 510 and 512 are carried out to see if the timer that has been set to the backup time interval has lapsed. If the timer has lapsed, hypervisor 210, at step 514, scans all bottom-level nested page tables for entries that have the dirty bit set to one. Then, at step 516, hypervisor performs a diff operation on all machine memory page sections that are indicated as being dirty by entries of bottom-level nested page tables that are dirty. In some cases, the diff operation is also performed on a portion of an adjacent machine memory page section if it is determined that a write operation that caused the machine memory page section to be dirtied may have also dirtied (i.e., spilled over to) the adjacent machine memory page section. For example, referring to FIG. 3E, if bottom-level page table 324a indicates that the bottom half of page 325 is dirty via the value of its D bit 334 while bottom-level page table 324b indicates that the top half of page 325 is not dirty via the value of its D bit 335, a diff operation is performed on the bottom half of page 325 and the portion of the top half of page 325 adjacent to the bottom half of page 325 that could have been dirtied as a result of a write operation that began on the bottom half of page 325 and spilled into the top half of page 325. In one embodiment, where the maximum size of a single write operation is 16 or N bytes, the portion of the adjacent machine memory page section that also undergoes a diff operation is 15 or (N–1) bytes. At step 518, changes to machine memory page sections as determined through the diff operation are transmitted to a backup machine. Then, at step 520, the timer is reset, and the method returns to step 510.

In the embodiment of the present invention described above, the diff operation is used to minimize the amount of data being transmitted over the network. It should be recognized that other operations that reduce network bandwidth consumption, such as compression and precopy, may be employed in place of the diff operation.

Figure 6:
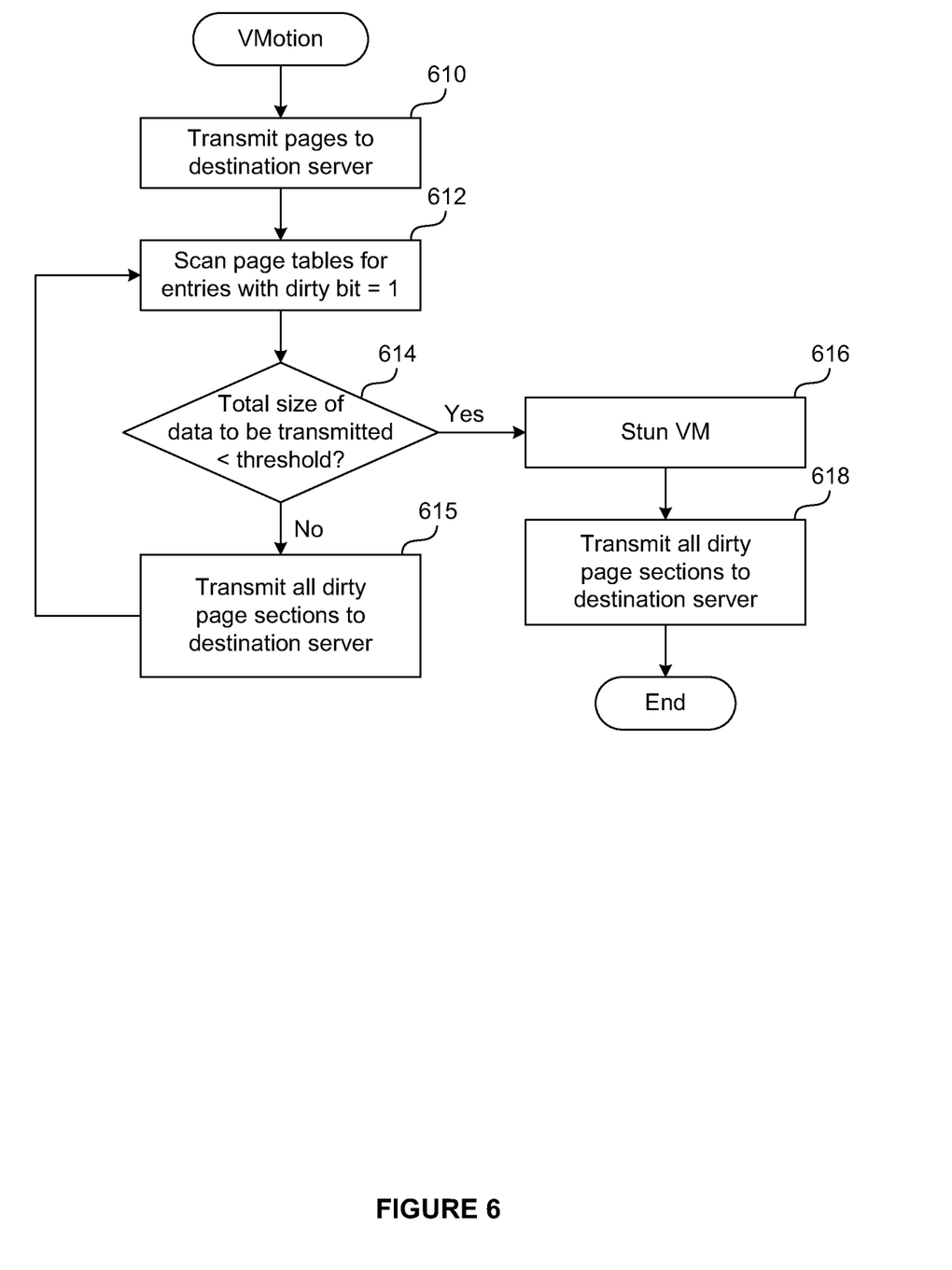
FIG. 6 is a flow diagram that illustrates the method for migrating an executing state of a virtual machine, according an embodiment of the present invention.

FIG. 6 is a flow diagram that illustrates the method for migrating an executing state of a virtual machine (VM), according to an embodiment of the present invention. In the embodiment described herein, hypervisor 210 is carrying out this method and, in doing so, transmits all machine memory pages of the VM to a destination server over a network. As a way to reduce the downtime of the VM, the VM is stunned and execution control is switched over to the destination server only when the total size of the machine memory pages left to be transmitted to the destination server is below a certain threshold. In addition, nested page tables referenced below correspond to nested page tables being maintained by hypervisor 210 for the VM that is being migrated.

At step 610, all machine memory pages of the VM are transmitted to the destination server. While this is happening, the VM continues to run and some of these machine memory pages become dirtied and D bits in the entries of bottom-level nested page tables corresponding to these machine memory pages will be set to one. At step 612, bottom-level nested page tables are scanned for entries that have the dirty bit set to one. Then, at step 614, the total size of data to be transmitted to the destination server is computed and compared against a threshold. The data to be transmitted includes machine memory page sections referenced by entries in bottom-level nested page tables that have the D bit set to one. In some cases, the data to be transmitted includes a portion of an adjacent machine memory page section if it is determined that a write operation that caused the machine memory page section to be dirtied may have also dirtied the adjacent machine memory page section. If the total size computed at step 614 is not less than the threshold, all dirty machine memory page sections referenced by entries in bottom-level nested page tables and any portions of adjacent machine memory page sections that could have been dirtied are transmitted to the destination server. The method then returns to step 612 to identify machine memory page sections that may have become dirtied while step 615 was being carried out.

Returning to the decision block at step 614, if the total size computed at step 614 is less than the threshold, the VM is stunned at step 616 and, at step 618, all dirty machine memory page sections referenced by entries in bottom-level nested page tables and any portions of adjacent machine memory page sections that could have been dirtied are transmitted to the destination server. After step 618, the method terminates, and hypervisor 210 can hand over execution control of the VM to the destination server.

Alternative embodiments of the present invention include a backup method where the diff operation is not performed and entire machine memory page sections are transmitted to the backup machine, and a migration method where the diff operation is performed and only the changed parts of machine memory page sections are transmitted to the destination server. In the examples given above, more granular dirty bit information provides savings in computational power in the case where diff operations are performed and only the changed portions are transmitted over the network to the target machine, and provides savings in network bandwidth consumption in the case where diff operations are not performed and machine memory page sections in their entirety are transmitted over the network to the target machine.

In a further embodiment of the present invention, the conventional component of the MMU that handles write operations that span more than one machine memory page is modified to also handle write operations that span more than one machine memory page section within a single machine memory page. With this modification, a write operation that spans more than one machine memory page section within a single machine memory page is translated into two separate write operations or two separate TLB and MMU interactions, each of which is confined to a single machine memory page section. As a result, a write operation that dirties a machine memory page section and spills over to another machine memory page section across a page section boundary to dirty the adjacent machine memory page section is translated into two separate write operations that cause the dirty bits in the PTEs that reference these two machine memory page sections to be set to 1. In addition, when checking to see if a write operation spans more than one machine memory page section within a single machine memory page, only the first and last bytes of the write operation are checked. It should be recognized that checking the first and last bytes in this manner is valid because write operations are strictly smaller than a page size.

It should be recognized that an additional benefit of the embodiments of the present invention described herein is that accessed bits acquire the same improvement in granularity that the dirty bits gain. Therefore, further embodiments of the present invention contemplate the use of the more granular accessed bit information in various applications in ways that would be evident to persons of skill in the art.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of migrating an executing state of a virtual machine running in a first computer system to a second computer system, the first computer system and the second computer system each having a memory management unit that manages memory mappings using a first set of hierarchically-arranged page tables for mapping guest virtual addresses to guest physical addresses and a second set of hierarchically-arranged page tables for mapping the guest physical addresses to machine memory addresses, comprising:

scanning entries of a first page table in the second set and a second page table in the second set that reference a common machine memory page, wherein the common machine memory page is a memory page referenced in the scanned entries of both the first page table and the second page table;

determining that a first section of the common machine memory page is dirty based on the entry of the first page table that references the common machine memory page and determining that a second section of the common machine memory page is not dirty based on the entry of the second page table that references the common machine memory page; and transmitting the first section of the common machine memory page to the second computer system.

2. The method of claim 1, further comprising:

stunning the virtual machine; and transmitting all sections of machine memory pages that are dirty to the second computer system.

3. The method of claim 1, wherein the first section and the second section of the common machine memory page do not overlap and each of the first section and the second section has a size that is $1/(2^M)$ of the size of the common machine memory page, where M is an integer greater than or equal to 1.

4. The method of claim 1, wherein said entries of the first page table and the second page table in the second set that reference the common machine memory page are associated with at least two different guest physical addresses.

5. The method of claim 4, wherein said at least two different guest physical addresses include a first guest physical address and a second guest physical address that differ by at least one bit value.

6. The method of claim 5, wherein the second set of hierarchically-arranged page tables includes a root table and a plurality of bottom-level tables, wherein each of a plurality of entries of the bottom-level tables references a machine memory page in common with at least one other entry of the bottom-level tables.

7. The method of claim 1, wherein the first section and the second section of the common machine memory page do not overlap, and wherein each of the first section and the second section has a size that is at most one-half of a size of the common machine memory page.

8. The method of claim 1, further comprising:
 determining a total size of all sections of machine memory pages that are dirty; and
 when the total size of all sections of machine memory pages that are dirty is less than a threshold:
  stunning the virtual machine;
  after stunning the virtual machine, transmitting all sections of machine memory pages that are dirty to the second computer system; and
  after stunning the virtual machine, handing over execution control of the virtual machine to the second computer system.

9. The method of claim 8, further comprising:
 when the total size of all sections of machine memory pages that are dirty is not less than the threshold:
  transmitting all sections of machine memory pages that are dirty to the second computer system while the virtual machine continues to execute in the first computer system.

10. A non-transitory computer readable medium comprising instructions for causing a first computer system to carry out a method of migrating an executing state of a virtual machine running in the first computer system to a second computer system, the first computer system and the second computer system each having a memory management unit that manages memory mappings using a first set of hierarchically-arranged page tables for mapping guest virtual addresses to guest physical addresses and a second set of hierarchically-arranged page tables for mapping the guest physical addresses to machine memory addresses, the method comprising:
 scanning entries of a first page table in the second set and a second page table in the second set that reference a common machine memory page, wherein the common machine memory page is a memory page referenced in the scanned entries of both the first page table and the second page table;
 determining that a first section of the common machine memory page is dirty based on the entry of the first page table that references the common machine memory page and determining that a second section of the common machine memory page is not dirty based on the entry of the second page table that references the common machine memory page; and
 transmitting the first section of the common machine memory page to the second computer system.

11. The non-transitory computer readable medium of claim 10, wherein the method further comprises:
 stunning the virtual machine; and
 transmitting all sections of machine memory pages that are dirty to the second computer system.

12. The non-transitory computer readable medium of claim 10, wherein the first section and the second section of the common machine memory page do not overlap and each of the first section and the second section has a size that is $1/(2^M)$ of the size of the common machine memory page, where M is an integer greater than or equal to 1.

13. The non-transitory computer readable medium of claim 10, wherein said entries of the first page table and the second page table in the second set that reference the common machine memory page are associated with at least two different guest physical addresses.

14. The non-transitory computer readable medium of claim 10, wherein the method further comprises:
 determining a total size of all sections of machine memory pages that are dirty; and
 when the total size of all sections of machine memory pages that are dirty is less than a threshold:
  stunning the virtual machine;
  after stunning the virtual machine, transmitting all sections of machine memory pages that are dirty to the second computer system; and
  after stunning the virtual machine, handing over execution control of the virtual machine to the second computer system.

15. The non-transitory computer readable medium of claim 14, wherein the method further comprises:
 when the total size of all sections of machine memory pages that are dirty is not less than the threshold:
  transmitting all sections of machine memory pages that are dirty to the second computer system while the virtual machine continues to execute in the first computer system.

16. A first computer system comprising a processor and a memory, wherein the processor is programmed to carry out a method of migrating an executing state of a virtual machine running in the first computer system to a second computer system, the first computer system and the second computer system each having a memory management unit that manages memory mappings using a first set of hierarchically-arranged page tables for mapping guest virtual addresses to guest physical addresses and a second set of hierarchically-arranged page tables for mapping the guest physical addresses to machine memory addresses, the method comprising:
 scanning entries of a first page table in the second set and a second page table in the second set that reference a common machine memory page, wherein the common machine memory page is a memory page referenced in the scanned entries of both the first page table and the second page table;
 determining that a first section of the common machine memory page is dirty based on the entry of the first page table that references the common machine memory page and determining that a second section of the common machine memory page is not dirty based on the entry of the second page table that references the common machine memory page; and
 transmitting the first section of the common machine memory page to the second computer system.

17. The first computer system of claim 16, wherein the method further comprises:
 stunning the virtual machine; and
 transmitting all sections of machine memory pages that are dirty to the second computer system.

18. The first computer system of claim 16, wherein the first section and the second section of the common machine memory page do not overlap and each of the first section and the second section has a size that is $1/(2^M)$ of the size of the common machine memory page, where M is an integer greater than or equal to 1.

19. The first computer system of claim 16, wherein the method further comprises:
 determining a total size of all sections of machine memory pages that are dirty; and
 when the total size of all sections of machine memory pages that are dirty is less than a threshold:
  stunning the virtual machine;
  after stunning the virtual machine, transmitting all sections of machine memory pages that are dirty to the second computer system; and after stunning the virtual machine, handing over execution control of the virtual machine to the second computer system.

20. The first computer system of claim 19, wherein the method further comprises:
when the total size of all sections of machine memory pages that are dirty is not less than the threshold:
transmitting all sections of machine memory pages that are dirty to the second computer system while the virtual machine continues to execute in the first computer system.

* * * * *